United States Patent [19]

Boswell

[11] Patent Number: 4,874,404
[45] Date of Patent: Oct. 17, 1989

[54] VACUUM CLEANER

[76] Inventor: Jerald O. Boswell, P.O. Box 5666, Wilmington, N.C. 28403

[21] Appl. No.: 317,536

[22] Filed: Mar. 1, 1989

[51] Int. Cl.⁴ .............................................. B01D 47/02
[52] U.S. Cl. .......................................... 55/86; 55/95; 55/244; 55/247; 55/DIG. 3; 261/120
[58] Field of Search ........................ 55/85, 86, 95, 165, 55/227, 228, 230, 247, 248, 255, 256, 244, DIG. 3; 261/120

[56] References Cited

U.S. PATENT DOCUMENTS

| | | | |
|---|---|---|---|
| 2,405,494 | 8/1946 | Dupuy | 261/120 |
| 2,954,095 | 9/1960 | Brock | 55/255 X |
| 3,034,273 | 5/1962 | Wallace | 55/DIG. 3 X |
| 3,778,978 | 12/1973 | Matsushita | 55/247 X |
| 3,875,679 | 4/1975 | Conduit | 55/230 X |
| 4,783,835 | 12/1988 | Rylander | 55/85 |

Primary Examiner—Charles Hart
Attorney, Agent, or Firm—Lynn E. Barber

[57] ABSTRACT

The invention is a vacuum cleaner for selectively cleaning dust from an environment. The cleaner has a water reservoir and an air entry port on the reservoir with a float means for directing the air toward the water and for breaking the surface film of the water. Air is made to move through the cleaner by a low power motor and fan located next to the reservoir.

13 Claims, 3 Drawing Sheets

VACUUM CLEANER

BACKGROUND OF THE INVENTION

1. Field of the Invention

This invention relates to vacuum cleaners and in particular, relates to vacuum cleaners in which a reservoir of water is used to collect particulate matter.

2. Description of the Related Art

In many occupations, very fine dust particles are created that must be removed without removal or disturbance of other small items that are being handled or that are present in the dusty area. For example, in dental laboratories, trained technical personnel generally work near a vacuum source so that the airborne particulate matter that is created in large quantities is removed from the work area. Many vacuum systems used in such an environment cause the metal burs, crowns and dies to be removed if they come too close to the vacuum opening, because the systems have a very strong suction and remove both the fine dust particles and the larger pieces indiscriminately, and thus, cannot be used to remove only the fine particles. In addition, in many of these vacuum systems, the very fine dust particles are drawn into the vacuum cleaner bags and, because of their minute size, are ejected into the air again through the filter on the vacuum cleaner. This creates potential health problems for the workers who must continuously breathe in high levels of dust. The high vacuum present very near the worker's hands also causes the hands to become very cold because the heat from the hands is drawn off by the vacuum system.

To assist in selective dust removal, a variety of vacuum cleaners has been designed. Some of these cleaners use water to collect the dust that is picked up in the cleaner. In the Aqua-Vac cleaner (Teledyne Hanau, Buffalo, N.Y.), a squirrel cage fan on the motor blows directly on the water in the reservoir without agitating the water directly. The Rainbow cleaner (Rex-Air Corp., Troy, Mich.) provides a large amount of suction causing the water in its reservoir to be displaced somewhat and thus allowing more dust particles to be wetted by movement of the water than in the Aqua-Vac. The large amount of suction on the Rainbow cleaner causes larger particles as well as dust particles to be removed from an area.

In cleaners where the water is not agitated enough to allow dust particles to be wetted, a layer of dust particles may collect on top of the water with the remaining dust particles being carried back out into the environment. Dust particles may also accumulate on the fins of the fan causing the fan to decrease in efficiency and requiring continual cleaning maintenance of the fan and reservoir. Cleaners having a water reservoir with a motor directly above the water reservoir have the potential of water condensation, as well as the potential for splashing of water on the motor unless a barrier is placed between the motor and the water.

Standard shop vacuum cleaners that may be used to vacuum up water often have a valve that turns off if the water level reaches too high a level, thus minimizing the likelihood of water coming in contact with the electrical components. These cleaner are not designed to remove small dust particles selectively, however, without removing larger pieces and are not designed to retain the dust particles within the cleaner.

It is therefore an object of this invention to provide a vacuum cleaner that picks up fine dust particles without picking up larger particles.

It is a further object of this invention to provide a vacuum cleaner that removes dust particles from the air without returning them to the air.

It is a further object of this invention to provide a vacuum cleaner that may be used for extremely long periods of time without decreasing its ability to remove dust from the air.

It is a further object of this invention to provide a vacuum cleaner that does not pull in so much air that it causes significant cooling of hands placed in the area being cleaned.

It is a further object of this invention to provide a vacuum cleaner that is inexpensive to manufacture and that has easily obtainable parts.

It is a further object of the invention to provide a vacuum cleaner that may be easily maintained and requires little cleaning of the fan.

Other objects and advantages will be more fully apparent from the following disclosure and appended claims.

SUMMARY OF THE INVENTION

The vacuum cleaner of the invention comprises a motor on a squirrel cage fan, the fan being connected to an enclosure over a water reservoir. A perforated cylinder surrounded by a flexible bag layer that is connected to a light weight float extends from an air inlet port on the enclosure toward the water surface so that the float rests on the surface of the water. When the motor is turned on, air is drawn from the environment outside the cleaner into the enclosure through the air inlet port and into the cylinder within the bag layer. The air movement and increased air pressure inside the bag layer cause the float to be agitated on the surface of the water, resulting in the dust and other small airborne particles being mixed into the water and wetted. The dust-depleted air exits the enclosure through the squirrel cage fan and out the fan exhaust port.

In the preferred embodiment, the vacuum cleaner of the invention comprises:

(a) an enclosed reservoir of water having an air entry tube connected to an enclosed space above the water;

(b) a vacuum production means connected to the enclosed space;

(c) a float means connected to said air entry tube, wherein said float means comprises a flexible bag cylinder attached to said air entry tube at a first end of said bag cylinder, said bag cylinder surrounding a pipe cylinder; and a buoyant piece connected to a second end of said bag cylinder; wherein said pipe cylinder is within said float means and is connected to said air entry tube, and said pipe cylinder has a plurality of holes.

Other aspects and features of the invention will be more fully apparent from the following disclosure and appended claims.

DETAILED DESCRIPTION OF THE INVENTION AND PREFERRED EMBODIMENTS THEREOF

The present invention comprises:

(a) an enclosed water reservoir having an air entry tube and an enclosed space over water placed in the reservoir;

(b) a vacuum production means connected to the enclosed space: and (c) a water float mean connected to the air entry port.

In the preferred embodiment, the air entry port is connectable to a hose for vacuuming.

Figure 1:
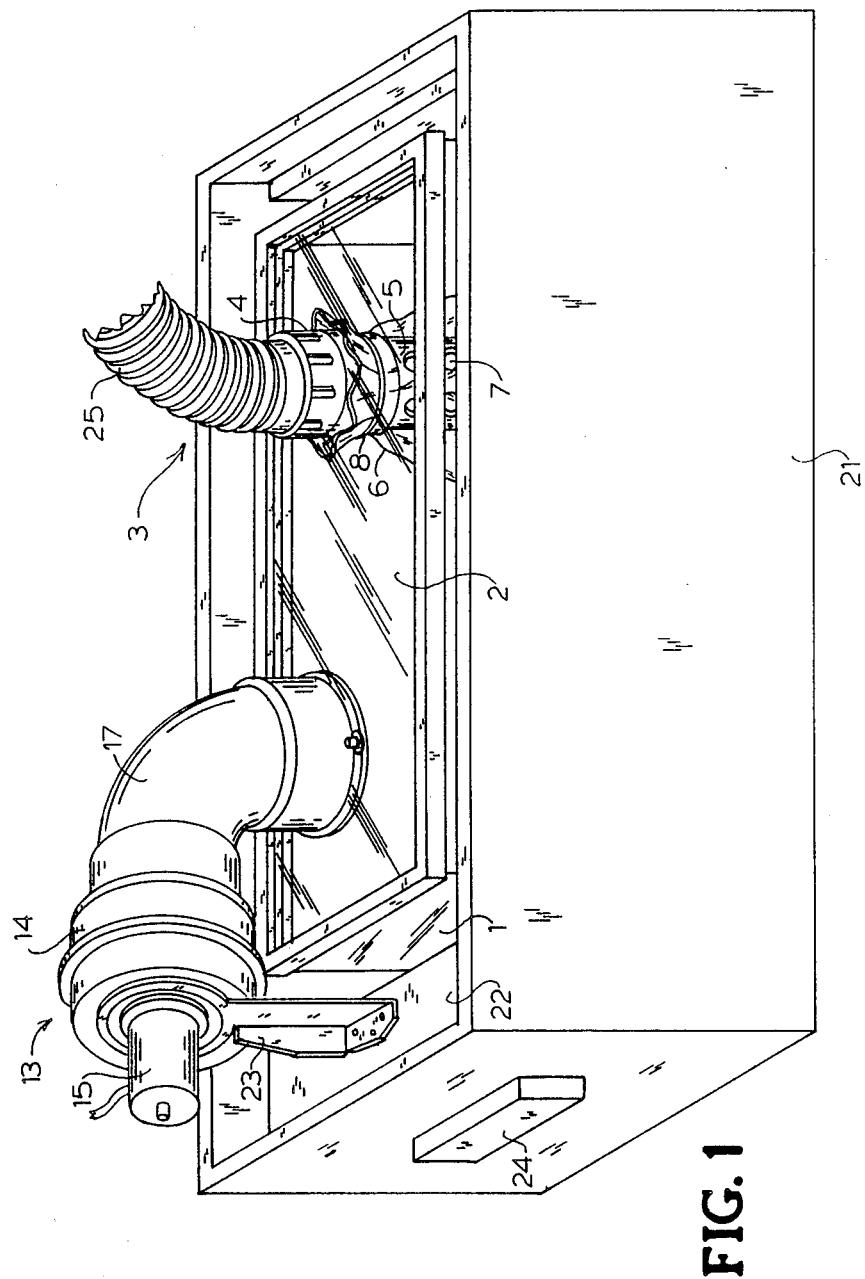
FIG. 1 is a perspective view of the top and one side of the vacuum cleaner of the invention.

In the preferred embodiment of the invention, the water reservoir comprises a water tank 1 such as a fish aquarium that has a volume of about 10 gallons (O'Dell Div. of AFG Inc., Canton, Ga.) (FIG. 1). The approximate dimensions of such a reservoir are about 12 inches deep, 10 inches wide and 20 inches long. In addition to typical glass aquariums, the reservoir may be made of aluminum or of other waterproof materials. Although the vacuum cleaner of the invention works with a small amount of water in the reservoir, such as one gallon, a volume of about 7 gallons in a gallon-sized reservoir provides ideal cleaning characteristics. Periodic additions of a small amount of Chlorox or other antimicrobial substance to the water in the tank 1 prevents growth of microorganisms and allows use of the same water without need for cleaning for long periods of time.

The enclosed space above the water, for a 10 gallon container and a volume of water of about 7 gallons, is about 4 inches high. The space above the water is enclosed by a cover 2 made by fitting a piece of plexiglas, preferably about ¼-inches thick, or other flat waterproof material in an airtight manner on the top of the reservoir.

The air entry port 3 preferably is located toward the far end of the reservoir tank 1 from the connection of the enclosed space to the vacuum production means 13 to minimize the direct flow of air through the space and to maximize dust and air contact with the water. The air entry port 3 should be at least 2–3 inches from the far end of the reservoir to allow there to be space for the float means to hang below the air entry port as discussed below.

In the preferred embodiment, the air entry port 3 comprises a PVC connector tube 4 inserted through a hole in the top of the reservoir in an airtight manner so that it extends through the top of the reservoir from outside of the reservoir to the inside of the reservoir. In the preferred embodiment, the dimensions and form of the entry port are made in any manner known in the art to enable the portion above the cover 2 to be connected to a hose, such as a 2-inch flexible hose, for vacuum cleaning. A PVC cylinder into the lower end of which a 2-inch or 4-inch PVC pipe may be mounted is a preferred connector tube 4. The PVC connector tube 4 may thus have a 2-inch inner diameter throughout for attaching a 2-inch pipe, or be scaled up from a 2-inch portion outside the tank 1 to a 4-inch portion inside the tank 2.

Figure 2:
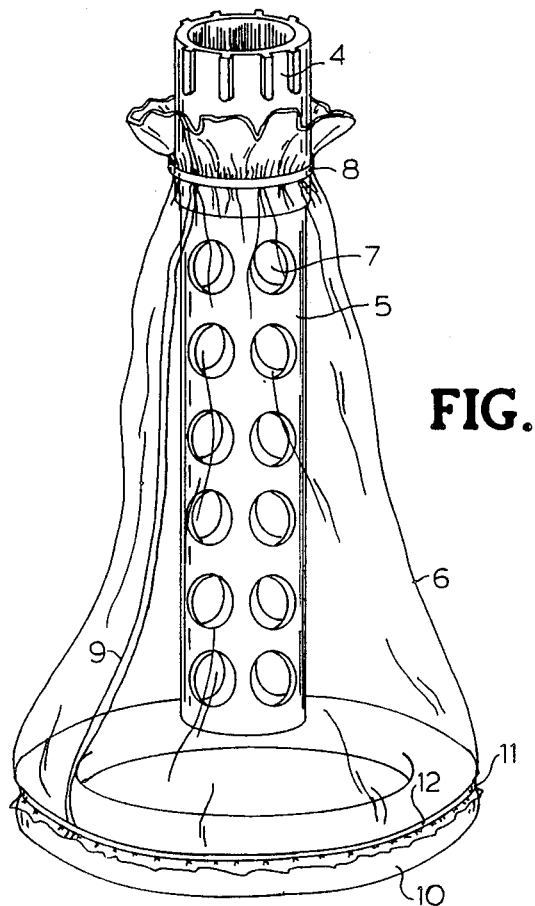
FIG. 2 is a perspective view of the air entry port, float means and pipe cylinder of the invention of FIG. 1.

A pipe cylinder 5, shown in FIG. 2, preferably made of 2-inch or 4-inch PVC pipe and in which numerous holes 7 have been cut and having a length sufficient to extend from above the cover 2 to near the bottom of the tank 1, is attached with glue or by threading or by any other attachment means to the portion of the connector tube 4 that protrudes into the reservoir. The pipe cylinder 5 is located within a flexible bag cylinder 6 (below). The holes 7 on the pipe cylinder 5 extend the length of the pipe cylinder 5 and preferably have a diameter of about 1 inch.

The flexible bag cylinder 6 is outside the pipe cylinder 5 and is fastened, by means such as a rubber band or other fastener 8, to the portion of the connector tube 5 that protrudes into the reservoir (FIG. 2). The bag cylinder 6 is preferably very thin, flexible and nonporous, and may be made of a material such as lightweight plastic. In the preferred embodiment, the bag cylinder 6 is formed of dropcloth plastic (1 mil) that is cut into pieces that are about two feet wide and 1½ feet long. The size may be adjusted as appropriate for larger or smaller reservoirs. The sides are sealed together into a seam 9 by means of a kitchen plastic bag sealer or by any other means to form a cylinder of plastic about 1½ feet long. The flexible bag cylinder 6 may also be made from a preformed plastic or other flexible cylinder. One end of the bag cylinder 6 is fastened to the portion of the connector tube 4 that protrudes into the inside of the reservoir and the other end is fastened to a float piece 10. The bag cylinder 6 is long enough so that no matter what the level of the water in the reservoir, the bag is long enough to hang from the cover of the reservoir down to the water level.

The float piece 10 preferably comprises a styrofoam or other lightweight, buoyant ring, such as is used for making holiday wreaths. A styrofoam ring with an outer diameter of about 8 inches and an inner diameter of about 5½ to 6½ inches works well, but other sizes may be used. A plastic float piece may also be used. A groove 11 is cut extending around the outer circumference of the float piece 10 to provide an indented fastening place to attach the float to the flexible bag cylinder 6. A rubber band or other similar fastening means 12 is wrapped around the bag cylinder 6 in the groove 11 so that the bag cylinder 6 extends over the float piece 10 and the fastening means 12 holds the bottom end of the bag cylinder 6 firmly and air-tightly around the outside of the float piece 10.

Figure 3:
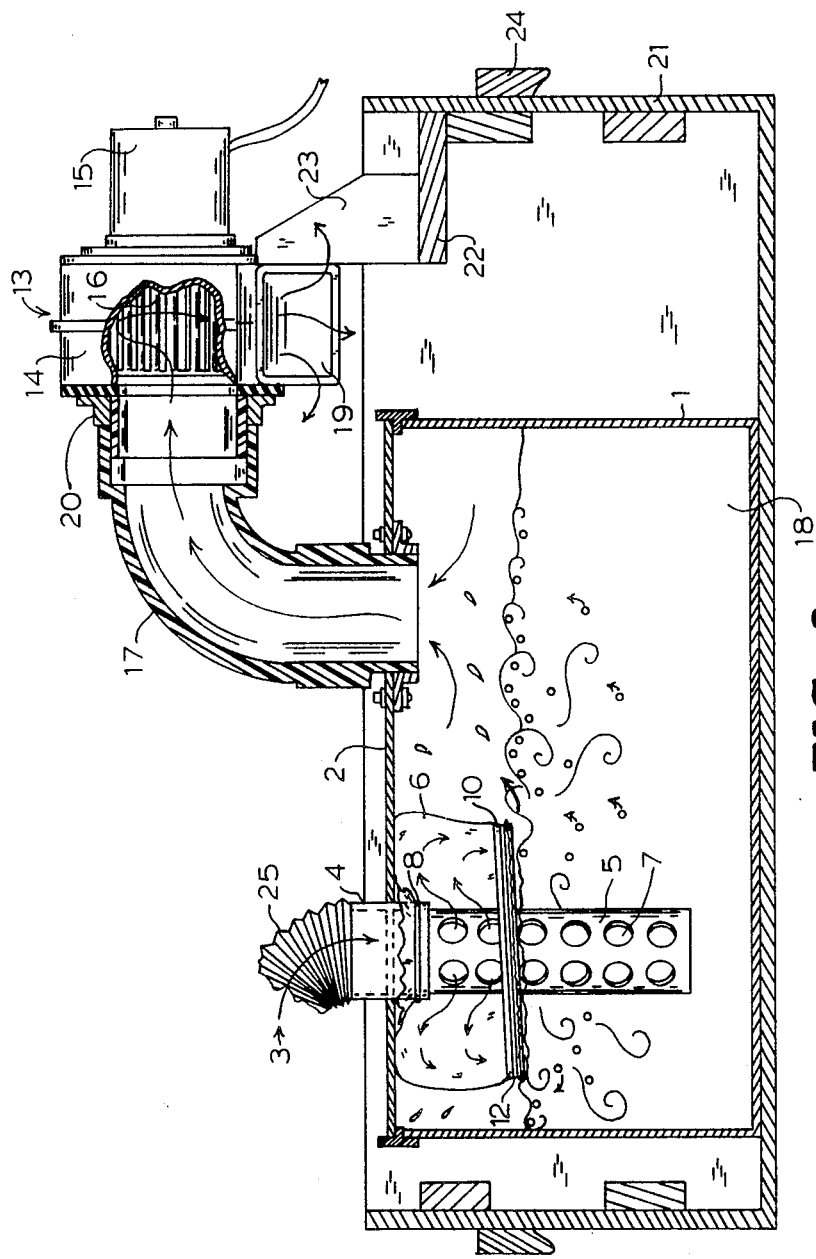
FIG. 3 is a schematic view of air movement when the vacuum cleaner of FIG. 1 is used, viewed from the opposite side as that shown in FIG. 1.

When the cleaner of the invention is used, the pipe cylinder 5 extends from the connector tube 4 into the water 18 so that air that enters the reservoir through the connector tube must pass into the pipe cylinder 5. The air entering the pipe cylinder 5 passes out the holes 7 of the pipe cylinder 5 that are above the water 18. The holes 7 in the pipe cylinder 5 that are below the water level become useful only when the water level drops below them, such as by evaporation or when less water is used initially. Air that escapes through holes 7 in the pipe cylinder 5 that are above the water level is caught by the bag cylinder 6. This causes the bag cylinder 6 to inflate and billow out above the water (FIG. 3) causing the float piece 10 to move about on the water surface. As the float piece 10 connected to the bag cylinder 6 bounces around rapidly due to the air movement within it, the surface of the water is continuously disturbed and is depressed by the force of the air. The combination of the movement of the plastic bag cylinder 6 and the force of the air on the water causes air bubbles to form under water. Essentially, the air is stirred into the upper layer of the water, particularly around the float piece 10. The dust particles in the air are caught up in the water in the rapid stirring of the air into the water and are wetted and do not remain on the water surface. Air in the bag is pushed downward within the bag cylinder 6 as more air enters, and it escapes from around the edge of the bag cylinder 6 after being released from bubbles, being stirred into the water and/or forceably impinging on the water. The advantage of a 4-inch pipe cylinder 5 is that the float piece 10 cannot move from side to side as much with the 4-inch pipe cylinder as with the 2-inch cylinder, and therefore very little dusty air inadvertently escapes from a reservoir that has a 4-inch pipe cylinder. As the cleaning process continues, dust particles thus continue to enter the pipe cylinder 5 and become wetted without either remaining on the surface of the water or flowing into the vacuum production means 13.

The vacuum production means 13 preferably comprises a small squirrel cage fan 14 with a capacity of 200 cfm with a low horsepower motor 15 such as a ⅛ hp (115 V, 2.2 amps) Fastco Fan obtained from Northern Hydraulics & Machine Corp. (Melrose Park, Ill.). A smaller capacity motor, such as one with a 150 cfm capacity, does not pick up many dust particles, and a larger capacity motor removes particles larger than fine dust particles such as the metal burrs in dental laboratory work. Another advantage of the small fan as compared to standard vacuum cleaners is the decreased noise level of the smaller motor.

With a motor-driven squirrel cage fan 14, air carrying moisture from the water does not come in contact with the motor 15 because the motor 15 is separate from the fan 14. Instead, the moist air is spun by the fins 16 of the squirrel cage fan 14 and then is ejected out the exhaust port 19 of the fan 14. The holes (not shown) on the motor 15 itself are not located near the fan exhaust port so that moisture is not blown into the motor. Small amounts of moisture in the air that happen to get into these holes do not damage the motor but evaporate from its hot surface.

The vacuum production means 13 is connected to the reservoir by a wide, elbow-shaped piece of PVC pipe 17, for example, a pipe with a 4 inch inner diameter. The right angle of the pipe 17 allows the fan 14 and motor 15 to be mounted off to the side of the reservoir and not above the water 18. Although the location of the vacuum production means 13 off to the side of the reservoir is not necessary, it provides a means to further segregate the motor 15 from moisture. The air exhaust port 19 of the fan 14 is directed out into the room away from the air entry port 3. The means of connection of the PVC pipe 17 to the fan 14 may be by bolting to a flange 20 attached to the fan 14 or by other means known in the art for attaching PVC pipe to other objects. The PVC pipe 17 may be glued or bolted or attached by any other means to the cover 2 of the reservoir or may just fit tightly within a hole in the cover 2.

To protect the reservoir from accidental breakage, particularly if a glass aquarium is used, to minimize accidental jostling of the water, to provide a means for supporting the motor 15 and fan 14, and to provide a means for transporting the vacuum cleaner of the invention, an exterior container 21 may be provided for the reservoir. An exterior container 21 that is longer than the reservoir and has a support shelf 22 attached at one end allows the motor 15 and fan 14 to be supported outside the reservoir by attaching the motor 15 to the support 22 by means of a mounting bracket 23. A container 21 of plywood with a wooden shelf 22 for a support is satisfactory. Handles 24 of wood or other materials may be used to make the reservoir more portable.

The vacuum cleaner of the invention may be used by connecting a piece of flexible tubing 25 to the portion of the connector tube 4 that protrudes outside the reservoir. The free end of the flexible tubing 25 may be used directly for vacuum-cleaning the area to be cleaned. Alternatively, the vacuum cleaner may be connected to a central vacuum system within a building so that a person desiring to use the vacuum cleaner in a particular room of the building connects flexible tubing to the vacuum port within or near to that room, as in traditional central vacuum systems.

The vacuum cleaner of the invention may also be placed in a dusty area and allowed to run without connecting it to a piece of flexible tubing, to provide a means for transfer of dust or other fine particles from the air of the room into the water in the reservoir. Thus, the cleaner of the invention may be used in dusty work environments such as woodworking areas or in the home or other areas to remove dust or other small particles such as pollen from the air.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A vacuum cleaner, comprising:
   (a) an enclosed reservoir of water having an air entry tube connected to an enclosed space above the water;
   (b) a vacuum production means connected to the enclosed space;
   (c) a float means connected to said air entry tube, wherein said float means comprises flexible bag cylinder attached to said air entry tube at a first end of said bag cylinder, said bag cylinder surrounding a pipe cylinder; and a buoyant piece connected to a second end of said bag cylinder;
   wherein said pipe cylinder is within said float means and is connected to said air entry tube, and said pipe cylinder has a plurality of holes.

2. A vacuum cleaner according to claim 1, wherein said air entry tube is connectable to a hose for vacuum cleaning.

3. A vacuum cleaner according to claim 1, further comprising a means for mounting the vacuum production means at the side of the water reservoir.

4. A vacuum cleaner according to claim 1, wherein said vacuum production means comprises a motorized squirrel cage fan.

5. A vacuum cleaner according to claim 4, wherein said motorized fan is mounted at the side of the reservoir.

6. A vacuum cleaner according to claim 5, further comprising an exterior container for the reservoir, said exterior container having a support means for holding the fan at the side of the reservoir.

7. A vacuum cleaner according to claim 1, wherein said buoyant float piece comprises a styrofoam ring.

8. A vacuum cleaner according to claim 1, wherein said bag cylinder comprises a plastic sheet.

9. A vacuum cleaner according to claim 1, wherein said pipe cylinder comprises a four-inch diameter PVC type.

10. A vacuum cleaner according to claim 1, wherein said pipe cylinder comprises a two-inch diameter PVC type.

11. A vacuum cleaner according to claim 1, wherein said reservoir comprises a ten-gallon tank, said tank containing about seven gallons of water.

12. A vacuum cleaner, comprising:
   (a) an enclosed reservoir of water having an air entry tube connected to an enclosed space over the water, said air entry tube connectable to a hose for vacuum cleaning;
   (b) a vacuum production means connected to the enclosed space, said vacuum production means comprising a motorized squirrel cage fan;
   (c) a float means connected to said air entry tube, said float means comprising:
      (i) a plastic bag cylinder attached to said air entry tube at a first end of said bag cylinder, said bag cylinder surrounding said pipe cylinder; and
      (ii) a buoyant float piece connected to a second end of said bag cylinder; and
   (d) a pipe cylinder within said float means and connected to said air entry tube, said pipe cylinder having a plurality of holes.

13. A method of removing fine particles from an environment, comprising:
   (a) providing a motorized fan;
   (b) applying low vacuum pressure to air in the environment having the fine particles by turning on the motor;
   (c) drawing the air and particles through an air entry tube;
   (d) drawing the air and particles into a perforated pipe cylinder attached to the air entry tube, said pipe cylinder located within a reservoir of water;
   (e) agitating the water in the water reservoir with a float piece attached to a flexible bag layer, said bag layer surrounding the pipe cylinder, and causing the fine particles to become wetted and remain in the water; and
   (f) exhausting the particle-depleted air from the reservoir through an exhaust port on the fan.

* * * * *